Jan. 17, 1967 P. E. HEILMANN ET AL 3,299,301

PIEZOELECTRIC CERAMIC FILTER

Filed Aug. 12, 1964 2 Sheets-Sheet 1

INVENTORS
PHILIP E. HEILMAN
JOHN CHESNEY
BY James and Franklin
ATTORNEYS

Jan. 17, 1967 P. E. HEILMANN ET AL 3,299,301

PIEZOELECTRIC CERAMIC FILTER

Filed Aug. 12, 1964 2 Sheets-Sheet 2

INVENTORS
PHILIP E. HEILMAN
JOHN CHESNEY
BY James and Franklin
ATTORNEYS

United States Patent Office 3,299,301

Patented Jan. 17, 1967

3,299,301

PIEZOELECTRIC CERAMIC FILTER

Philip E. Heilmann, Kearny, and John Chesney, Roselle Park, N.J., assignors to General Instrument Corporation, Newark, N.J., a corporation of New Jersey Filed Aug. 12, 1964, Ser. No. 389,068

12 Claims. (Cl. 310—9.1)

This invention relates to electric wave filters, especially piezoelectric ceramic filters, and more particularly to intermediate frequency band pass filters.

It is already known that two piezoelectric elements in vibrational contact may be used as a tuned transformer, and further, that by placing the elements under pressure, the resonance curve may be broadened to give the unit a band pass characteristic. One object of the present invention is to provide an improved structure for this purpose.

A more particular object of the invention is to provide such a filter for use at the intermediate frequency of an amplitude modulation radio receiver. More specifically, the filter may center at 262.5 kc. for automobile radios, and at 455 kc. for home radios. A further object is to provide a filter which is compact, inexpensive, and convenient in form.

To accomplish the foregoing general objects, and other more specific objects which will hereinafter appear, our invention resides in the piezoelectric filter elements and their relation one to another, as are hereinafter more particularly described in the following specification. The specification is accompanied by drawings in which.

Figure 1:
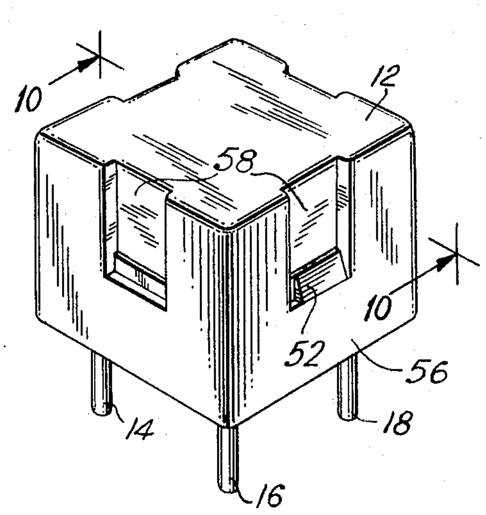
FIG. 1 is a perspective view showing a piezoelectric ceramic filter embodying features of our invention.

Referring to the drawing, and more particularly to FIG. 1, the housing 12 is substantially cube-shaped, and is approximately one half inch along each edge. This device operates at 262.5 kc., and is intended for use in automobile radio receivers. The structure becomes considerably smaller when designed to operate at 455 kc. for use in home radios. The body 12 has four terminal pins projecting downwardly for mounting and for electrical connections. Three of the pins are visible in FIG. 1, these being marked 14, 16 and 18.

Figure 2:
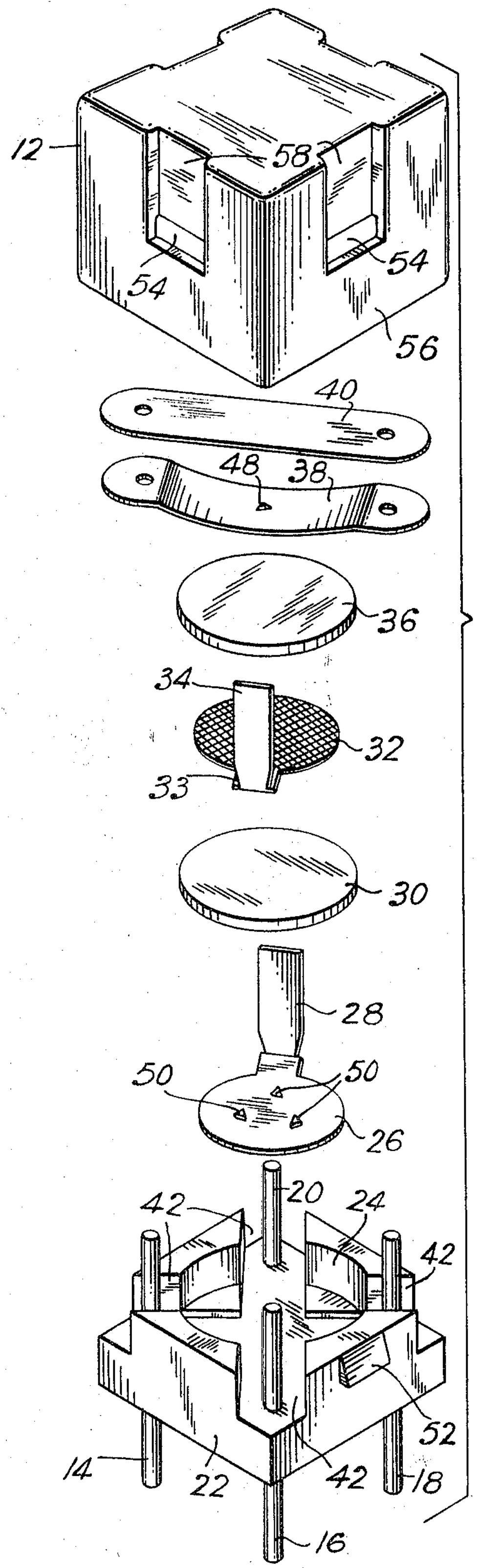
FIG. 2 is an exploded view showing the elements of the device separated from one another.

Referring now to FIG. 2, the parts are shown vertically separated in their order of assembly. The base or holder 22 is molded out of a suitable insulation material, and has a recess or well 24. There are short, upright, stiff wire inserts secured through the corners of the base, and these are marked 14, 16, 18 and 20. The lower ends project downward beneath the base, and the upper ends project above the base and may be termed corner posts. A sheet metal bottom contact 26 is dimensioned to be received in recess 24, and has a tail or soldering lug 28, which may be soldered to one of the posts, in this case, the post 20.

Next, there is a piezoelectric ceramic disc 30, which is received in recess 24 and rests on the contact 26.

The stack next has a common contact 32, which is received in the recess 24 over the ceramic disc 32. The common contact 32 has a tail or soldering lug 34, and this is soldered to the post 16 located diametrically opposite the post 20. A second piezoelectric ceramic disc 36 then is received in recess 24, and rests on the common contact 32.

A resilient means 38 acts as a top contact and spring, and is preferably received over the two remaining posts 14 and 18, by the provision of end holes in the spring. The posts 14 and 18 may be deformed over the spring 38 at proper height to provide the desired axial pressure to produce the desired filter band width. A keeper strip 40 is preferably disposed over the spring 38 to help stabilize or maintain constant pressure, as is explained later. In such case the posts 14 and 18 are deformed over the keeper strip 40, instead of being deformed directly over the spring 38, but in a more general sense, the posts are deformed over the spring in either case. The cover 12 is applied over the posts and the base 22.

Considering the arrangement in somewhat greater detail, the base 22 preferably is square, and the recess 24 preferably is circular. The wires 14, 16, 18 and 20 may be secured in the corners of the base as inserts during the molding operation. The base has diagonal passages 42 extending radially from the circular recess 24 to the posts. The tail of the bottom contact 26 extends radially through a passage 42 to the post 20, and then extends upwardly along the post.

Figures 6, 7, 8, 9:
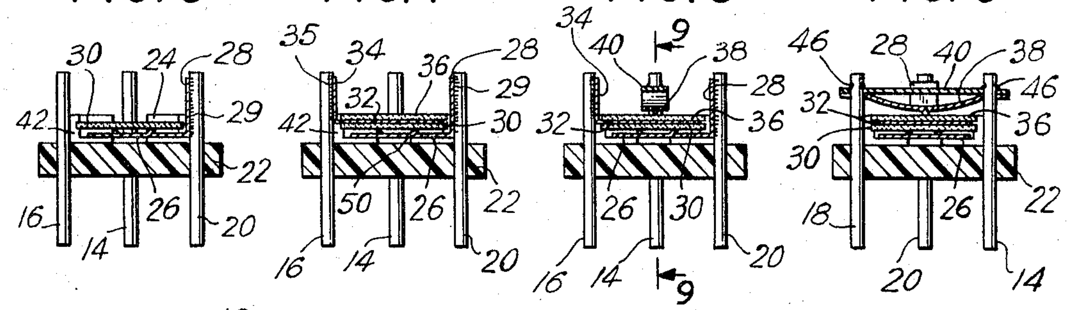
FIG. 6 is a diagonal section illustrating the first two steps in the assembly of the parts.
FIG. 7 is a similar view illustrating the next two steps.
FIG. 8 is a similar view explanatory of the next two steps.
FIG. 9 is a section taken at right angles to the section of FIG. 8.

This is perhaps better shown in FIG. 6 in which the base 22 with its recess 24 has received the bottom contact 26, and the upwardly bent tail 28 lies along and is soldered directly to the inner surface of the post 20, as is indicated at 29. The ceramic disc then is placed in the recess 24, directly over the bottom contact 26.

Referring next to FIG. 7, the common contact 32 is added, and its horizontal tail portion extends through the radial passage leading to the wire or post 16. The upright tail portion 34 lies against and is soldered along the inner side of the post 16, as is indicated at 35. The second ceramic disc 36 then is put into position over the common contact 32.

FIGS. 8 and 9 show the subsequent addition of the resilient downwardly bowed strip 38 which acts as both a contact and a spring. The ends of the spring have holes received over the posts 14 and 18. Only post 14 is visibile in FIG. 8, but FIG. 9 is a section taken at the line 9—9 of FIG. 8, and shows both the posts 14 and 18, and how they receive the spring 38 and also the keeper 40.

The spring 38 is stressed and held downward by staking the metal of the posts 14 and 18 above the spring. In practice the assembly is preferably mounted in a fixture having electrical connections from the terminals to instruments which show the frequency response or band width, and the spring is tightened by means of a screw until the desired electrical characteristic is obtained, whereupon the staking tools of the fixture move in and stake the posts. This measurement is more satisfactory than attempting to measure the spring force in pounds during assembly.

It has been found that any warping or bending of the posts 14 and 18 will alter the pressure and consequently the characteristic curve. The spring force alone tends to spread the posts. This difficulty may be avoided, and the characteristic may be stabilized, by the addition of the keeper strip 40. This is a straight strip which has holes at proper spacing to receive the posts 14 and 18. The keeper strip 40 is preferably added before staking the posts, and the posts are staked directly over the keeper strip as indicated at 46 in FIG. 10. The screw of the fixture in such case may bear against the keeper, which is a convenience because the posts are left clear for the staking tools.

Reverting to FIG. 2, the spring 38 preferably has a point or tang excised downwardly, as indicated at 48. This point 48 is more clearly shown in FIG. 10. It bears against the center of the ceramic disc 36.

Figure 10:
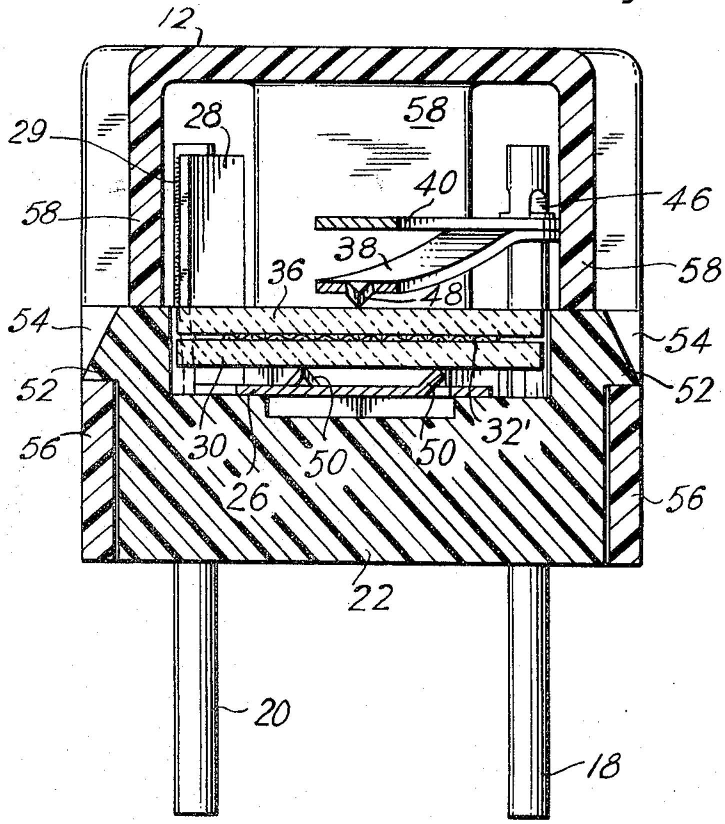
FIG. 10 is a section drawn to enlarged scale and taken approximately in the plane 10—10 of FIG. 1.

It has been found that a similar point may be struck upward at the center of the bottom contact 26 to bear against the bottom of the lower ceramic disc 30. The electrical operation then is excellent, but such an arrangement has been found to introduce some instability in the event of mechanical shock. Such a mechanical shock may cause tilting of the disc assembly between the top and bottom points, with a consequent slight change in frequency. We have found that this difficulty may be avoided by striking three points upward from the bottom contact 26, as is shown at 50 in FIG. 2. These points are also shown in FIG. 10, and it will be understood that the disc assembly then is seated stably.

When the common contact 32 is made thicker a greater pressure is needed, and this is desirable because it increases mechanical stability. On the other hand, aberrations in frequency response then may appear because of the thickness of the tail 34 which loses flexibility. It is desirable that the tail be kept thin and flexible, while the body is made effectively thick, to avoid such aberrations.

Figure 4:
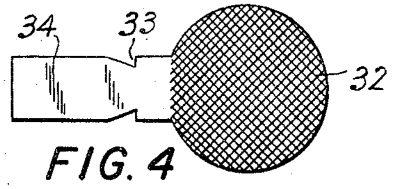
FIGS. 4 and 5 illustrate another form of common contact in which sheet metal is embossed.
Figure 5:
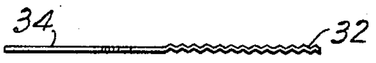

These requirements may be met by the construction shown in FIGS. 4 and 5, in which the contact 32 and tail 34 are made of thin sheet metal, but the circular body 32 of the contact is embossed over its surface to give it greater apparent thickness, as shown in FIG. 5.

Figure 3:
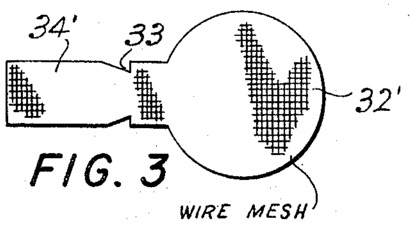
FIG. 3 illustrates one form of common contact utilizing a wire mesh.

Another satisfactory form of common contact is that shown in FIG. 3, in which the contact is made out of thin wire mesh, rather than a solid sheet. The body 32' and tail 34' then have like material, but the tail is flexible because of the mesh construction, and the body is somewhat thickened because of the mesh construction. In FIG. 10 the mesh contact is employed.

In both cases (FIG. 3 and FIG. 4) the tail is preferably notched, as shown at 33, this marking the point at which the tail is bent upward along its adjacent post.

The cover 12 is preferably molded out of a suitable plastic material. It might be cemented to the base, but preferably, and as here shown, it fits over and around the base and posts with a snap fit. More specifically, FIG. 1 shows an outwardly projecting detent 52 which forms a part of the base and which passes through a mating opening in the cover 12. This detent is also shown at 52 in FIG. 2, and there are two such detents, as is best shown in FIG. 10, which also shows the openings 54 in which the detents 52 are received. The lower part of the cover is a skirt 56 which fits around the base 22, and which expands or yields slightly as the cover is pushed down over the detents 52.

The downward motion of the cover is limited by inwardly displaced parts or channels 58, the lower ends of which bear against the top of the base. In the form here shown there are four inwardly displaced parts, and four openings, so that the cover may be applied to the base in any of four positions.

The piezoelectric ceramic material requirements are such that the composition should be substantially time and temperature stable with regard to its elastic, dielectric, and piezoelectric properties. This stability may be achieved by proper composition and processing. The ceramic material may be based on barium titanate, or on lead titanate and lead zirconate, or on lead stannate, or may be based on niobate and metaniobate systems. In the illustrated structure they are subjected to a force of approximately three pounds.

An inherent weakness in a mechanically resonant device is the existence of overtones which cause spurious responses. With two identical discs the overtones may be coincident and may reinforce one another. However, by adjusting the electrical poling of the two discs to achieve different electromechanical couplings, one from the other, the overtones fall at different frequencies, resulting in improved performance in respect to spurious response.

The spurious and unwanted responses may be reduced by say 100 to 1 by using two discs whose radial mode electromechanical coupling coefficients are substantially different from one another. The discs are ground or pressed to sizes such that their anti-resonant frequencies are approximately equal to each other, and to the center frequency of the pass band.

The frequency response is a function of the compressive force holding the two discs in axial alignment. When the center contact is thicker the band width is narrowed. When a harder material, say hard copper instead of soft copper, is used for the center contact, the band width is narrowed. This in turn requires the application of increased pressure to regain a desired band width. The increased pressure improves stability, as previously mentioned.

Figure 11:
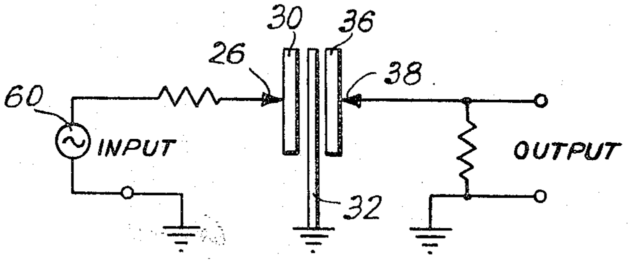
FIG. 11 is an electrical diagram explanatory of how the filter or transformer may be used.

The electrical diagram of FIG. 11 shows how an input symbolized at 60, is connected to the bottom contact 26 bearing against ceramic disc 30. The common or ground contact is shown at 32. The ceramic disc 36 receives the contact spring 38 which in turn leads to an output terminal. The application of pressure on the discs 30 and 36 broadens the frequency response curve of the unit, and gives it a desired flattened top or band pass characteristic.

The band pass characteristic obtained is equivalent to that of conventional coil and capacitor double-tuned IF transformers. Two polarized piezoelectric ceramic discs are used which vibrate in the fundamental radial mode. The common contact serves as an electrical ground and enhances the band pass characteristic by eliminating or substantially reducing transmission between the input and the output circuits by capacitive feed-through. The electrical energy then transmitted is only the electromechanical conversion energy or the piezoelectric activity.

The cover 12 may be made of polyethylene, but many other plastics could be used, only a slight yielding being needed for the snap engagement. The base may be made of an alkyd resin or a phenolic resin. A stable thermosetting resin is preferred.

It is believed that the construction and method of assembly of our improved piezoelectric ceramic filter, as well as the advantages thereof, will be apparent from the foregoing detailed description. It will also be apparent that while we have shown and described the invention in a preferred form, changes may be made without departing from the scope of the invention as sought to be defined in the following claims.

We claim:

1. A piezoelectric filter comprising a molded insulation base, said base having a recess, and short stiff wire inserts acting as corner posts, a bottom contact in said recess and having a tail soldered to one of said posts, a piezoelectric disc in said recess and resting on said bottom contact, a common contact in said recess over said disc, said common contact having a tail which is soldered to a post located opposite the aforesaid tail and post, a second piezoelectric disc received in said recess and resting on said common contact, a resilient means acting as a top contact and spring, said means being received over the remaining two posts, said posts holding said spring at proper height to provide a desired pressure and consequent filter band width.

2. A piezoelectric ceramic filter comprising a molded insulation base, said base being square and having a circular recess, and short stiff wire inserts secured through the corners of said base, the lower ends of said wires projecting downward beneath the base to act as terminals, the upper ends of said wires projecting above the base to act as corner posts, a bottom contact in said recess and having a tail soldered to one of said posts, a piezoelectric ceramic disc in said recess and resting on said bottom contact, a common contact in said recess over said ceramic disc, said common contact having a tail which is soldered to a post located diametrically opposite the aforesaid tail and post, a second piezoelectric ceramic disc received in said recess and resting on said common contact, a resilient downwardly bowed strip acting as a top contact and spring, said spring having holes near its ends received over the remaining two posts, said posts being deformed over said spring at proper height to provide the desired pressure and consequent filter band width, and a cover received over said posts and base.

3. A piezoelectric ceramic filter comprising a molded insulation base, said base being square and having a circular recess, and short stiff wire inserts molded in the corners of said base, the lower ends of said wires projecting downward beneath the base to act as terminals, the upper ends of said wires projecting above the base to act as corner posts, said base having diagonal passages from the circular recess to the posts, a bottom contact in said recess and having a tail extending radially to and upward along a post, said tail being soldered to said post, a piezoelectric ceramic disc in said recess and resting on said bottom contact, a common contact in said recess over said ceramic disc, said common contact having a tail extending radially to and upward along and being soldered to a post located diametrically opposite the foresaid tail and post, a second piezoelectric ceramic disc received in said recess and resting on said common contact, a resilient downwardly bowed strip acting as a top contact and spring, said spring having holes near its ends received over the remaining two posts, said posts being deformed over said spring at proper height to provide the desired pressure and consequent band width, and a molded plastic cover received over said posts and base.

4. A piezoelectric ceramic filter comprising a molded insulation base, said base being square and having a circular recess, and short stiff wire inserts molded in the corners of said base, the lower ends of said wires projecting downward beneath the base to act as terminals, the upper ends of said wires projecting above the base to act as corner posts, said base having diagonal passages from the circular recess to the posts, a bottom contact in said recess and having a tail extending radially to and upward along a post, said tail being soldered to said post, a piezoelectric ceramic disc in said recess and resting on said bottom contact, a common contact in said recess over said ceramic disc, said common contact having a tail extending radially to and upward along and being soldered to a post located diametrically opposite the aforesaid tail and post, a second piezoelectric ceramic disc received in said recess and resting on said common contact, a resilient downwardly bowed strip acting as a top contact and spring, said spring having holes near its ends received over the remaining two posts, a keeper strip received diametrically on the same posts over the spring, said posts being deformed over said keeper strip to help maintain a desired pressure adjustment of the spring, and a molded plastic cover received over said posts and base.

5. A piezoelectric ceramic filter comprising a molded insulation base, said base being square and having a circular recess, and short stiff wire inserts secured through the corners of said base, the lower ends of said wires projecting downward beneath the base to act as terminals, the upper ends of said wires projecting above the base to act as corner posts, said base having diagonal passages from the circular recess to the posts, a sheet metal bottom contact in said recess and having a tail extending radially to and upwardly along a post, said tail being soldered to said post, a piezoelectric ceramic disc in said recess and resting on said bottom contact, a common contact in said recess over said ceramic disc, said common contact having a tail extending radially to and upward along and being soldered to a post located diametrically opposite the aforesaid tail and post, a second piezoelectric ceramic disc received in said recess and resting on said common contact, a resilient downwardly bowed strip acting as a top contact and spring, said spring having holes near its ends received over the remaining two posts, said posts being staked to keep the pressure adjustment of the spring, and a molded plastic cover received over said posts and base, said base and cover having mating detents which engage with a snap engagement to hold the cover on the base.

6. A piezoelectric ceramic filter comprising a molded insulation base, said base being square and having a circular recess, and short stiff wire inserts secured through the corners of said base, the lower ends of said wires projecting downward beneath the base to act as terminals, the upper ends of said wires projecting above the base to act as corner posts, said base having diagonal passages from the circular recess to the posts, a sheet metal bottom contact in said recess and having a tail extending radially to and upwardly along a post, said tail being soldered to said post, a piezoelectric ceramic disc in said recess and resting on said bottom contact, a common contact in said recess over said ceramic disc, said common contact having a tail extending radially to and upward along and being soldered to a post located diametrically opposite the aforesaid tail and post, a second piezoelectric ceramic disc received in said recess and resting on said common contact, a resilient downwardly bowed strip acting as a top contact and spring, said spring having holes near its ends received over the remaining two posts, a keeper strip received diametrically on the same posts over the spring, said posts being staked to keep the pressure adjustment of the spring, and a molded plastic cover received over said posts and base, said base and cover having mating detents which engage with a snap engagement to hold the cover on the base.

7. A piezoelectric device as defined in claim 1, in which the bottom contact has three upwardly struck points for bearing against and providing a stable three-point support for the ceramic disc.

8. A piezoelectric device as defined in claim 2, in which the bowed spring has a single downwardly struck point for bearing against the center of the upper ceramic disc.

9. A piezoelectric device as defined in claim 1, in which the common contact is made of wire mesh.

10. A piezoelectric device as defined in claim 1, in which the common contact and its tail are made out of sheet metal, and in which the body of the contact is embossed over its entire area with a large number of projections and recesses in order to give the contact an increased apparent thickness without however increasing the thickness of the tail.

11. A piezoelectric device as defined in claim 3, in which the tail of the common contact is inwardly notched to substantially reduced dimension between its radial part and its upwardly extended soldered part.

12. A piezoelectric filter comprising a molded insulation base, said base having a recess, and short stiff wire inserts secured through the corners of said base, the lower ends of said wires projecting downward beneath the base to act as terminals, the upper ends of said wire projecting above the base to act as corner posts, a bottom contact in said recess and having a tail soldered to one of said posts, a piezoelectric disc in said recess and resting on said bottom contact, a common contact in said recess over said disc, said common contact having a tail which is soldered to a post located diametrically opposite the aforesaid tail and post, a second piezoelectric disc received in said recess and resting on said common contact, a resilient means acting as a top contact and spring, said means being received over the remaining two posts, said posts holding said spring at proper height to provide a desired pressure and consequent filter band width, and a cover received over said posts and base.

References Cited by the Examiner

UNITED STATES PATENTS

| | | | |
|---|---|---|---|
| 2,147,712 | 2/1939 | Mason | 310—9.1 |
| 2,392,993 | 1/1946 | Morse | 310—9.8 |
| 2,434,043 | 1/1948 | Kershaw | 310—8.9 |
| 2,434,265 | 1/1948 | Fruth | 310—8.9 |
| 2,482,451 | 9/1949 | Adams | 310—8.9 |
| 2,484,004 | 10/1949 | Adams | 310—8.9 |

MILTON O. HIRSHFIELD, *Primary Examiner.*

J. D. MILLER, *Assistant Examiner.*